United States Patent [19]
Murakami et al.

[11] Patent Number: 5,947,651
[45] Date of Patent: Sep. 7, 1999

[54] INDEXABLE INSERT

[75] Inventors: Daisuke Murakami; Norihide Kimura; Reizo Murakami; Nobuyuki Kitagawa; Akihiko Ikegaya, all of Itami, Japan

[73] Assignee: Sumitomo Electric Industries, Ltd., Osaka, Japan

[21] Appl. No.: 09/017,713

[22] Filed: Feb. 5, 1998

[30] Foreign Application Priority Data

Feb. 6, 1997 [JP] Japan .................................. 9-023438

[51] Int. Cl.$^6$ .................................................. B23B 27/22
[52] U.S. Cl. .......................... 407/114; 407/115; 407/116
[58] Field of Search .................................. 407/113, 114, 407/115, 116

[56] References Cited

U.S. PATENT DOCUMENTS

| | | | |
|---|---|---|---|
| 4,993,892 | 2/1991 | Takahashi | 407/115 X |
| 5,249,894 | 10/1993 | Bernadic et al. | 407/114 |
| 5,584,616 | 12/1996 | Katbi et al. | 407/114 |
| 5,743,681 | 4/1998 | Wiman et al. | 407/116 X |

FOREIGN PATENT DOCUMENTS

| | | |
|---|---|---|
| 0 567 899 A1 | 11/1993 | European Pat. Off. . |
| 1-15442 | 10/1983 | Japan . |
| 4-26166 | 1/1990 | Japan . |
| 0109612 | 4/1990 | Japan .................................. 407/115 |
| WO 93/08944 | 5/1993 | WIPO . |

*Primary Examiner*—Andrea L. Pitts
*Assistant Examiner*—Henry W. H. Tsai
*Attorney, Agent, or Firm*—McDermott, Will & Emery

[57] ABSTRACT

An indexable insert with a chip breaker configured such that chips produced under various cutting conditions from rough cutting to finish cutting can be disposed of in an optimum way. Protrusions are provided in a chip breaker groove to extend from a central land toward the respective corners of the insert. Each protrusion has a breaker wall which is concave and curved such that chips produced always collide against the breaker wall at an angle of 10°–40° so that the chips are curled helically with a helix angle of 10°–40° and broken into small pieces reliably.

2 Claims, 6 Drawing Sheets

INDEXABLE INSERT

BACKGROUND OF THE INVENTION

This invention relates to an indexable insert having a polygonal shape in plan and used for cutting machine parts, and more particularly an indexable insert having an improved chip breaker which can break chips discharged during continuous cutting under different cutting conditions into desirable lengths.

FIG. 1A shows a conventional indexable insert having chip breaker grooves. This indexable insert 1 has cutting edges 2 at peripheral edges of the top face (or ridges defined by the top face and the four sides). Chip breaker grooves 3 are formed on the top face along the entire cutting edges 2. Also formed on the top face is a central land 4 from which protrusions 6 extend toward the respective corners 5. As shown in FIG. 1B, each protrusion 6 tapers toward the respective corner, and has its tip cut so as to intersect the bisector of the corner angle at a right angle and define at its front and sides breaker walls 6a that rise obliquely from the breaker groove 3 toward the ridgelines 7 of the protrusion 6.

With this type of indexable insert, the distance from each cutting edge 2 to the terminal end of each breaker groove 3, i.e. to the ridgeline 7 mainly determines the chip curling tendency and chip breakability. Also, this distance determines the permissible feed rate range during normal cutting. That is, the shorter this distance, the higher the chip curling tendency and thus the better the chip breakability and the cutting performance of the insert at a low feed rate. But if this distance is too short, undue curling force tends to act on chips under high feed rate conditions. This increases the possibility of the insert getting clogged with chips and makes cutting unstable. That is, this distance limits the chip disposal range of each insert. Thus, different chip breakers are needed for different cutting conditions.

Various attempts have been proposed to provide inserts which can expand the chip disposal range. One of such inserts is disclosed in examined Japanese utility model publication 1-15442. This insert has, as shown in FIG. 2, protrusions 6 each having arcuate, convex (toward the cutting edges 2) ridgelines 7 intersecting each other on the bisector of the corner angle. With this arrangement, the ridgelines 7 have no points nearest to the straight cutting edges 2, unlike the arrangement of FIG. 1, in which the ridgelines 7 have points 8 nearest to the cutting edges.

The applicant of this invention has proposed a breaker-shaped, triangular indexable insert (in Examined Japanese utility model publication 4-26166) as shown in FIG. 3. This indexable insert 1 has a central land 4, protrusions 6 extending from the land 4 toward the respective corners 5, and ridges 9 lower than the protrusions 6 and provided in the breaker groove 3 between the tips of the protrusions 6 and the respective corners of the cutting edge, and between both sides of the protrusions 6 and the straight portions of the cutting edge. Chips produced during light cutting are disposed of by the breaker walls 9a of the ridges 9. Chips produced during large-depth, high-feed-rate cutting get over the ridge 9 and disposed of by the breaker wall 6a of the protrusion 6.

Chip disposal mechanism is roughly classified into two types. In one type of chip disposal, chip breakers continuously and helically curl long chips by colliding them against the breaker wall. The helical chips thus formed are broken into small pieces having lengths l (shown in FIG. 8) ranging from 20 mm to 50 mm due to their own inertia. This type of chip disposal is hereinafter referred to as continues type chip disposal. This type of chip disposal is mainly used to dispose of chips produced during light cutting such as finish cutting.

In the other type of chip disposal, chip breakers curl chips by colliding them against the breaker wall to break them into small pieces each having a half-curl to one-curl length. Chip disposal of this type is hereinafter referred to as breaking type chip disposal. This type is mainly used for general-purpose cutting other than light cutting, and rough cutting.

Conventional indexable inserts cannot necessarily perform continuous type chip disposal satisfactorily. Thus, breaking type chip disposal was often used even in situations where the continuous type chip disposal is more desirable. Thus, conventional indexable inserts cannot expand the chip disposal range as expected.

For example, in the continuous type chip disposal, the chip breaker shown in FIG. 3 will produce continuous helical chips 40. But depending upon the cutting conditions (depth of cut, feed rate, cutting speed, type of workpiece, etc.), long unbroken chips as shown in FIG. 9 may be produced. Such chips tend to wind around the tool, causing machine trouble. Thus, in the conventional arrangement, in the region where satisfactory chip disposal is impossible with the continuous type chip disposal, the breaking type chip disposal is used by shortening the distance from the cutting edge to the chip breaker. This arrangement however narrows the chip disposal range.

In the continuous chip disposal, no large strain as required in the breaking type disposal has to be applied to chips. Thus, if it is possible to break long chips 40 produced in the continuous type disposal into small pieces as shown in FIG. 8, the distance from the cutting edge to the chip breaker can be increased. This in turn makes it possible to dispose of chips without curling them so markedly not only during light cutting but during general-purpose cutting and rough cutting. The chip disposal range can thus be expanded significantly.

An object of this invention is to answer these requirements by improving the shape of the chip breaker.

SUMMARY OF THE INVENTION

According to this invention, there is provided a polygonal indexable insert having a central land on a top face thereof, a cutting edge defined by a peripheral edge of the top face, a breaker groove provided in the top face between the central land and the cutting edge so as to extend along the entire length of the cutting edge, and protrusions formed in the breaker groove to extend from the central land toward respective corners of the insert, each of the protrusions having an inclined breaker wall at its tip, the each breaker wall being concave and curved such that a tangential line of the breaker wall at any given point thereon forms an angle of 10°–40° with respect to a line that intersects at a right angle at the given point a line that passes the given point and a point bisecting each corner of the insert.

The indexable insert may further comprise a ridge lower than the protrusions is provided so as to connect to the tip of each of the protrusions, each of the ridges having at tip thereof a breaker wall which is concave and curved so as to satisfy all the conditions as defined above.

The inventors of this application observed detailedly chips produced during continuous type chip disposal in an attempt to find out why long unbroken chips are produced. FIG. 10 shows an enlarged view of a portion (shown in the chain box of FIG. 8) of the helical curled chip 40, which is a 20–55 mm broken piece of a long chip. The letter α indicates the angle of the chip side 42 relative to the chip central axis 41. This angle is hereinafter referred to as chip helix angle.

As a result of detailed observation of chips, the inventors discovered that there is an intimate relationship between the chip helix angle α and the chip length l, and that the main reason why chips cannot be disposed of stably is because, with conventional chip breakers, the chip helix angle varies as the cutting conditions change. Specifically, vertically curled chips having a helix angle α of 0°–10°, and laterally curled chips having a helix angle α of 40°–90° tend to be discharged unbroken. On the other hand, chips having a helix angle α of 10°–40° can be easily broken into small pieces as shown in FIG. 8. Among them, chips having a helix angle α of 20°–30° can be broken into especially small and short pieces.

The problem now boils down to the development of a chip breaking structure which can stably produce chips having a helix angle of 10°–40°. The solution to this problem which the inventors discovered is the chip breaking structure with the breaker wall having a concave, arcuate surface as defined above. In this arrangement, all chips always collide against the breaker wall at an angle of 10°–40° and curl with a helix angle of 10°–40°. For the reasons described above, such chips can be easily broken into small pieces without resorting to the breaking type disposal even during finish cutting or light cutting. This makes it possible to increase the distance from the cutting edge to the chip breaker. Thus, even during general-purpose cutting and rough cutting, it is not necessary to curl chips so markedly.

Other features and objects of the present invention will become apparent from the following description made with reference to the accompanying drawings, in which:

DETAILED DESCRIPTION OF THE PREFERRED EMBODIMENT

Figure 1A:
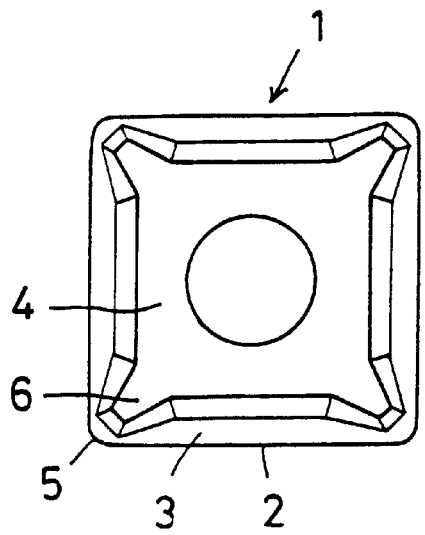
FIG. 1A is a plan view of a conventional indexable insert with a chip breaker groove.

FIGS. 4A–4D shows an embodiment of an indexable insert according to this invention. The illustrated indexable or throwaway insert 1 has a square shape in plan view. But the insert of this invention may have any other polygonal shape including a rectangle, triangle and diamond. The indexable insert 1 has cutting edges 2 which are peripheral edges of its top surface. A chip breaker groove 3 is formed on the top surface along the entire cutting edges 2. Also formed on the top of the insert is a central land 4. As shown in FIG. 1D, the chip groove 3 has its terminal end connected to the edge of the land 4.

A protrusion 6 extends from each corner of the central land 4 toward the corresponding corner 5 of the insert 1. The protrusions 6 are constricted at their proximal ends. But this is not an essential requirement.

Figure 1B:
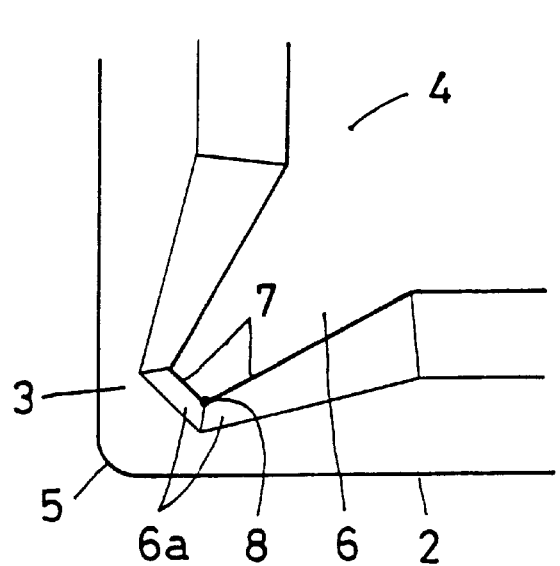
FIG. 1B is an enlarged plan view of one corner of the insert of FIG. 1A.
Figure 2A:
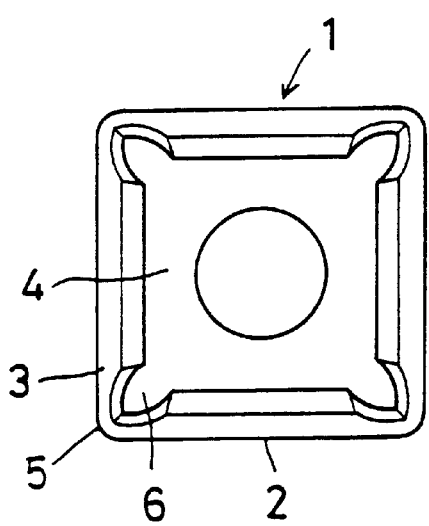
FIG. 2A is a plan view of another conventional indexable insert with a chip breaker groove.
Figure 2B:
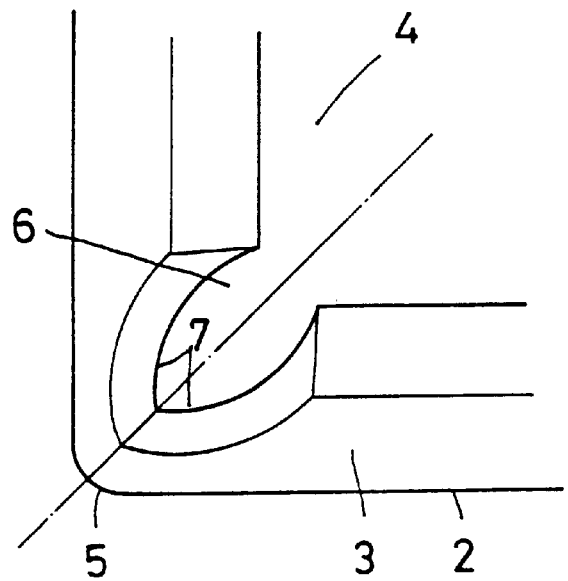
FIG. 2B is an enlarged plan of one corner of the insert of FIG. 2A.

As shown in detail in FIGS. 1B and 1C, each protrusion 6 is provided at its tip with chip breaker walls 6a rising obliquely from the bottom 3a of the breaker groove 3. According to this invention, the breaker walls 6a are concave arcuate walls that are shaped such that the tangential line of each of the breaker walls 6a at any given point thereof forms an angle (breaker colliding angle) θ of 10°–40° with respect to a line 32 that intersects at a right angle at said given point a line 31 that passes said given point and a point 34 bisecting the corner cutting edge (i.e. the point at which the bisector 35 of the corner angle intersects the cutting edge at the corner 5).

Figure 5A:
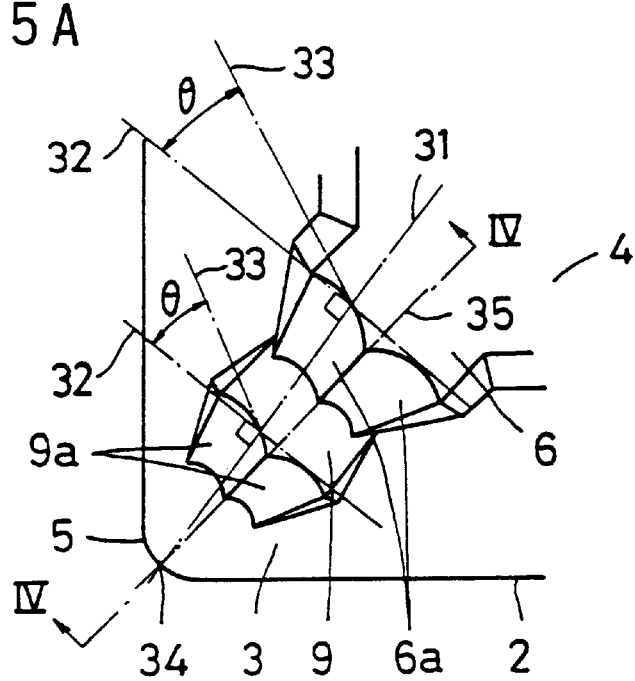
FIG. 5A is a partial enlarged sectional view of another embodiment.
Figure 5B:
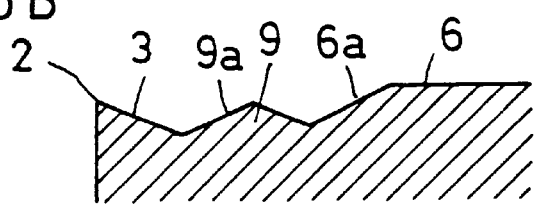
FIG. 5B is a sectional view taken along line IV—IV of FIG. 5A.

FIGS. 5A and 5B show a partial plan and section of another embodiment.

The indexable insert of this embodiment has a central land 4, protrusions 6 extending from to the land 4, and ridges 9 lower than the protrusions 6 and connected to the tips of the respective protrusions 6. Arcuate concave chip breaker walls 9a having a breaker collision angle θ of 10°–40° are provided at the tip of each ridge 9. But in the illustrated two-tier arrangement, the breaker walls 6a near each protrusion 6 may have a conventional configuration.

The indexable inserts 1 of FIGS. 4A–4D and 5A and 5B have their arcuate concave breaker walls 6a and 9a arranged symmetrically with respect to the corner angle bisector 35 so that each insert corner can be used both for right-handed cutting and left-handed cutting. But the arcuate concave breaker walls having a breaker collision angle θ of 10°–40° will have the same desirable effect on inserts of a type in which each corner can be used only for the right-handed cutting or left-handed cutting.

Figure 6:
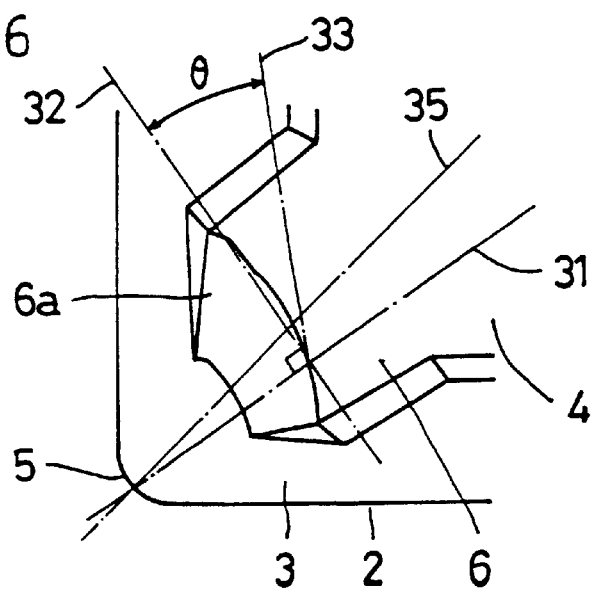
FIG. 6 is a partial enlarged sectional view of still another embodiment.

For example, the concept of this invention is applicable to an insert for right-handed cutting only, as shown in FIG. 6. In this embodiment, each protrusion 6 has a single arcuate wall 6a having no central boundary. An insert for left-handed cutting would be a mirror image of FIG. 6 as viewed from back.

The insert of FIG. 5 having a ridge 9 can also be adapted for right-handed cutting only or left-handed cutting only by changing the shape of the breaker wall 9a similarly.

[Examples]

Figure 3A:
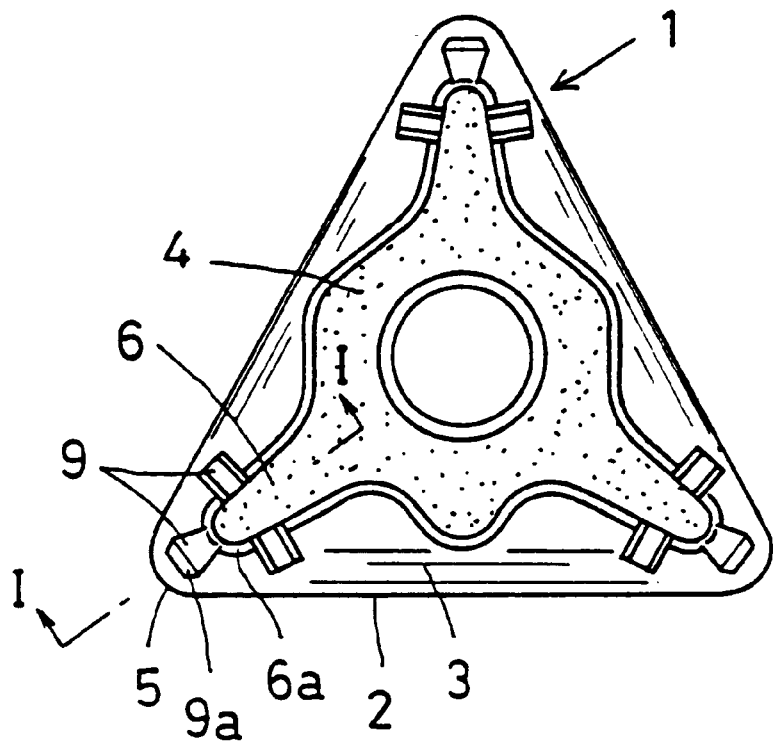
FIG. 3A is a plan view of still another conventional indexable insert.
Figure 3B:
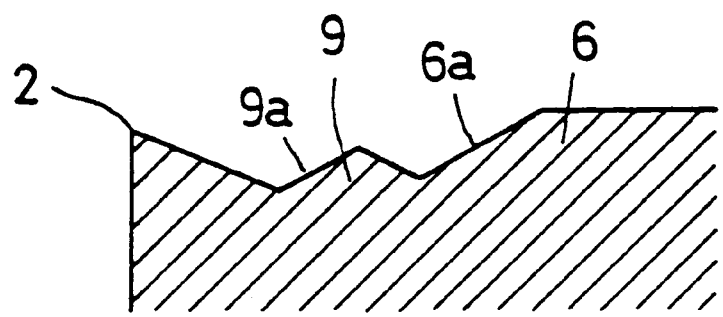
FIG. 3B is an enlarged section taken along line I—I of FIG. 3A.
Figure 4A:
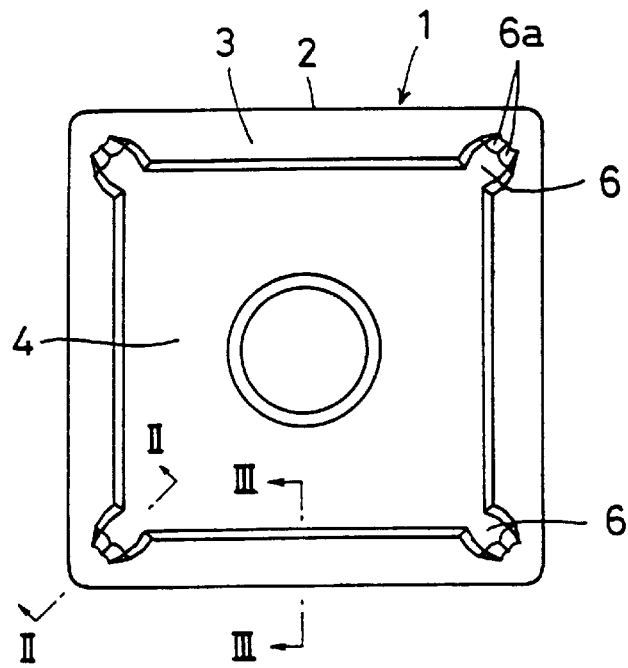
FIG. 4A is a plan view of an embodiment of an indexable insert according to this invention.
Figure 4C:
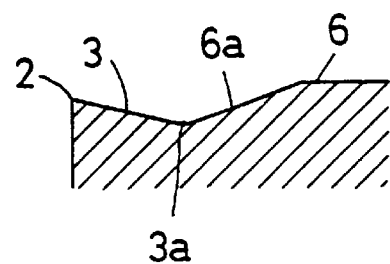
FIG. 4C is an enlarged sectional view taken along line II—II of FIG. 4A.
Figure 4B:
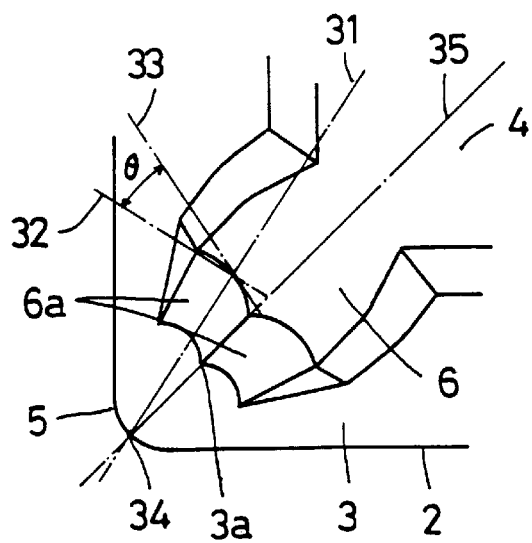
FIG. 4B is an enlarged plan view of one corner of the insert of FIG. 4A.
Figure 4D:
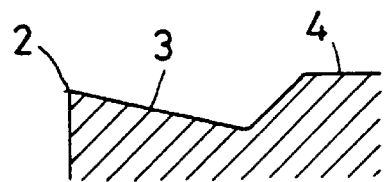
FIG. 4D is an enlarged sectional view taken along line III—III of FIG. 4A.

In order to confirm the effect of the invention, a cutting experiment on a lathe was conducted using an indexable insert A having the shape of FIG. 4A with a breaker collision angle θ of 25° (Article according to the invention), indexable inserts B and C of FIG. 4A having breaker collision angles θ of 5° and 60°, respectively (Comparative Articles), and an indexable insert D shown in FIG. 3 (conventional insert). In all the inserts A–D, the distance from the corner 5 shown in FIG. 4C to the tip 3a of the protrusion 6 was 1.5 mm.

The experiment was carried out under the following cutting conditions:

Workpiece: S15C

Indexable inserts: CNMG432

Insert holder: lateral cutting edge angle 5°

Cutting speed: 150 m/min

Type of cutting: dry, longitudinal, continuous cutting

Figure 7:
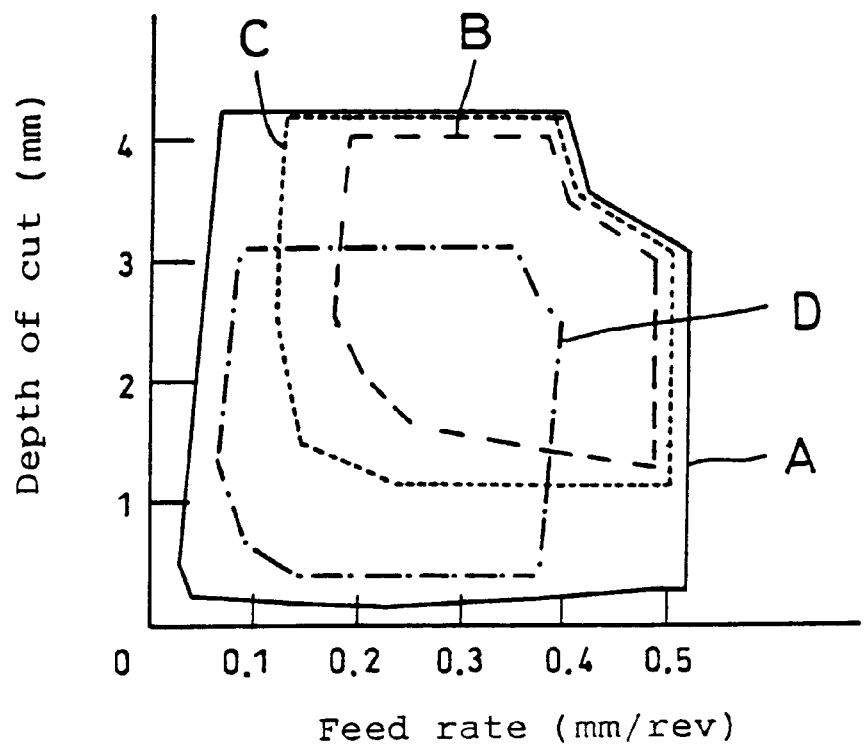
FIG. 7 is a graph comparing usable regions.

FIG. 7 shows the usable ranges of the respective inserts A–D. The usable ranges were determined by the chip disposability evaluation method (described in "Method of Classifying Chips" edited by the Cutting Property Committee of the Japan Precision Machine Society). Type 6 chip to Type 3 chip in the main chip classification were judged to be good chips. Thus, usable ranges are ranges within which Type 3 to Type 6 chip is formed.

Figure 9:
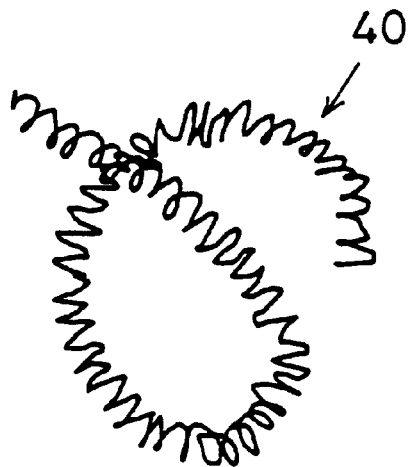
FIG. 9 shows unpreferable chips in the continuous type chip disposal.
Figure 10:
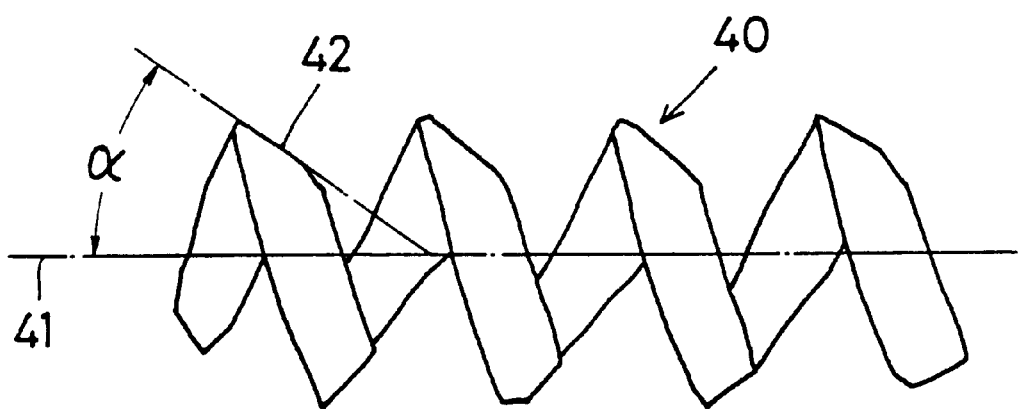
FIG. 10 is an enlarged view of the portion of the chip in the chain box of FIG. 8.

As shown in FIG. 7, Comparative Articles B and C were narrow in chip disposable range during light cutting. This is because continuous long chips were formed unbroken as shown in FIG. 9. For Conventional Insert D, chips curled excessively during rough cutting. This resulted in increase in cutting resistance which in turn caused unstable cutting, thus narrowing the usable range during rough cutting.

Figure 8:
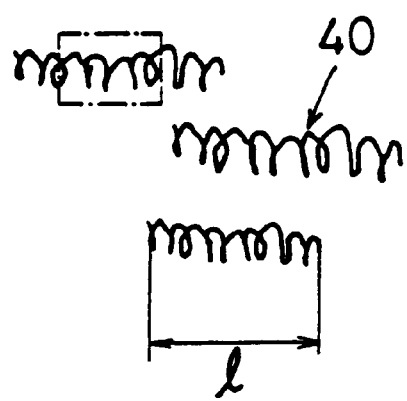
FIG. 8 shows preferable chips in the continuous type chip disposal.

In contrast, with Article A of the invention, chips helically curled and broke into small pieces as shown in FIG. 8 during light cutting. During rough cutting, too, chips did not curl excessively, so that chips were broken smoothly. Thus, chips were disposable smoothly in a wide cutting range from rough cutting to finish cutting.

The indexable insert according to this invention can effectively break chips during finish cutting and light cutting. Thus, in this range, no breaking type step is necessary, which makes it possible to shorten the distance from the cutting edges to the chip breakers. This solves the problem of excessive curling of chips in the range from general-purpose cutting to rough cutting. Workpieces can thus be cut stably in a wide cutting range from finish cutting to rough cutting. This minimizes breakdown of cutting machines due to chips getting tangled, and lowering of machining accuracy due to the inserts getting clogged with chips, thus increasing productivity and improving product reliability.

A single indexable insert can take care of all types of cuttings from rough cutting to finish cutting. There is no need to change inserts every time the cutting conditions change. This eliminates the downtime of the cutting machines for insert exchange, thus increasing productivity. Also, it is possible to simplify tool stock control and reduce the tool cost.

What is claimed is:

1. A polygonal indexable insert having a central land on a top face thereof, a cutting edge defined by a peripheral edge of said top face, a breaker groove provided in said top face between said central land and said cutting edge so as to extend along the entire length of said cutting edge, and protrusions formed in said breaker groove to extend from said central land toward respective corners of the insert, each of said protrusions having an inclined breaker wall at its tip, said each breaker wall being concave over an entire surface thereof with no convex portion and curved such that a tangential line of said breaker wall at any given point thereon forms an angle of 10°–40° with respect to a line that intersects at a right angle at said given point a line that passes said given point and a point bisecting each corner of the insert.

2. The indexable insert of claim 1 wherein a ridge lower than said protrusions is provided so as to connect to the tip of each of said protrusions, each of said ridges having at tip thereof a breaker wall which is concave and curved so as to satisfy all the conditions as defined in claim 1.

* * * * *